July 17, 1934.  C. F. JOHNSON  1,966,628
APPARATUS FOR MEASURING FLOWING LIQUIDS
Filed Feb. 6, 1933
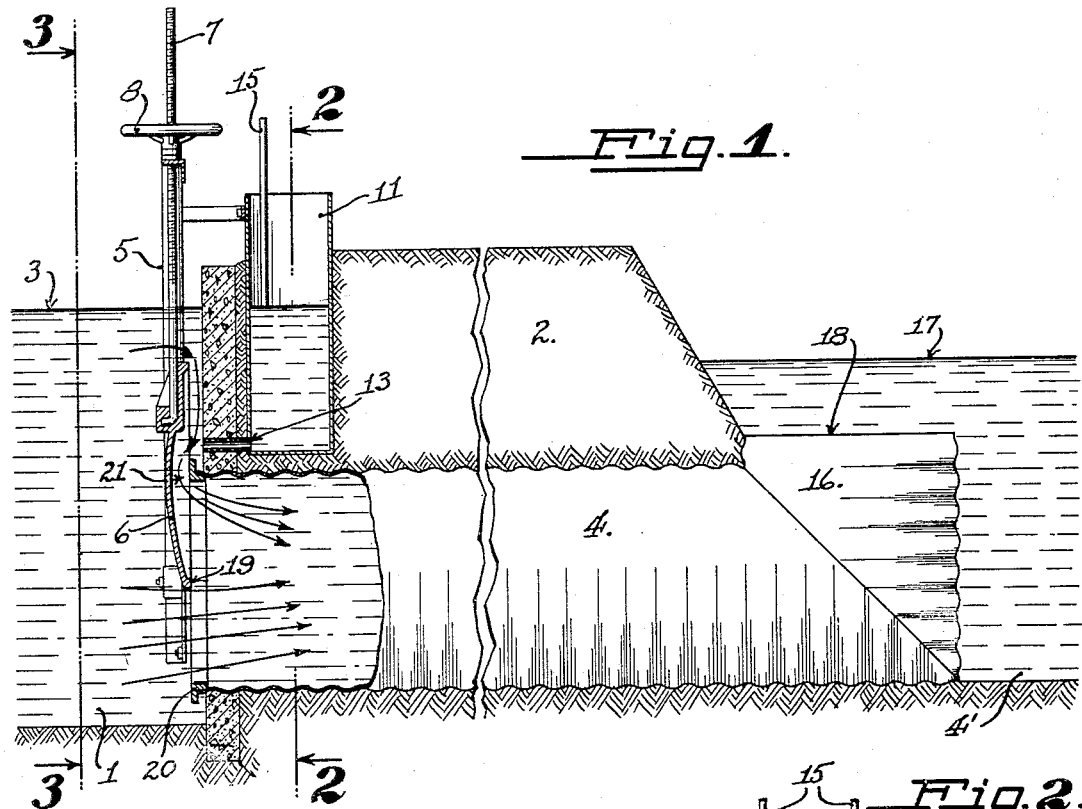
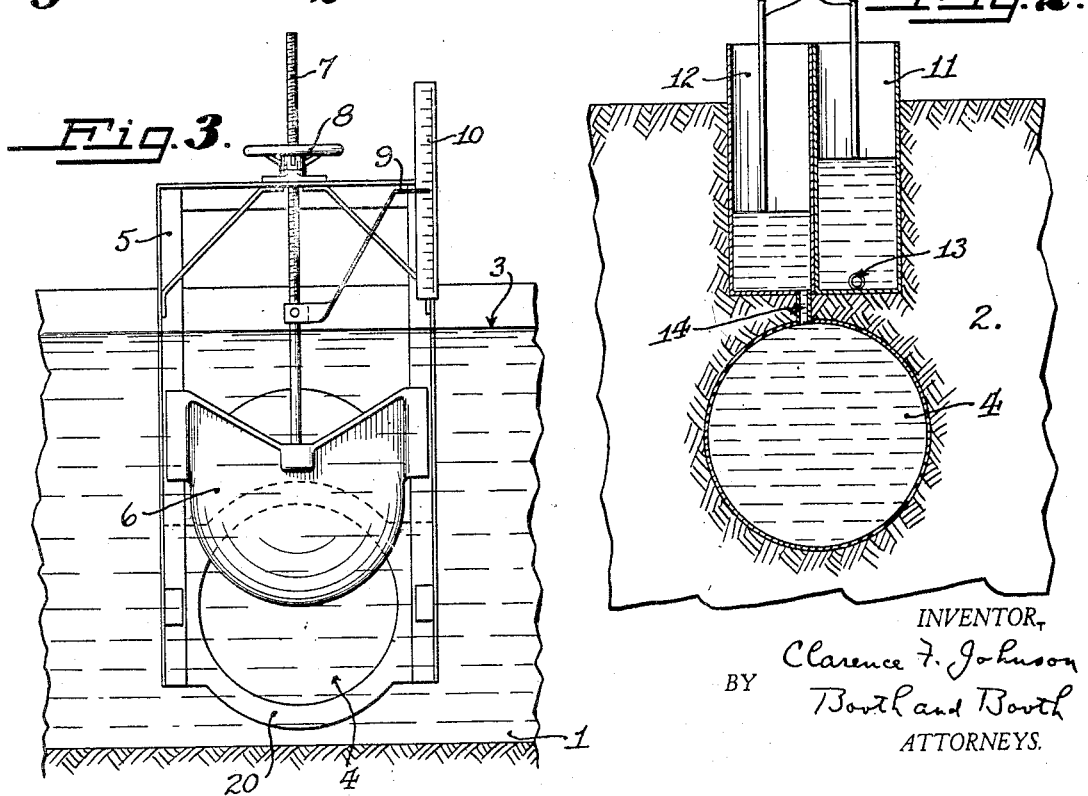
INVENTOR,
Clarence F. Johnson
BY Booth and Booth
ATTORNEYS.

Patented July 17, 1934

1,966,628

UNITED STATES PATENT OFFICE 1,966,628

APPARATUS FOR MEASURING FLOWING LIQUIDS

Clarence F. Johnson, Fresno, Calif., assignor to California Corrugated Culvert Co., Berkeley, Calif., a corporation of California Application February 6, 1933, Serial No. 655,352

3 Claims. (Cl. 73—167)

This is a continuation in part of my application Serial No. 376,318, filed July 6th, 1929, under the same title.

The invention relates to the art of measuring the amount of water flowing through a submerged gate or orifice, and is particularly adapted for use in irrigation systems, in which the user either pays for the exact amount of water taken from the supply reservoir or canal, or is restricted in the amount of water which he is allowed to take. In such systems, it is customary to measure the amount of water used either by a weir or a meter, both of which are expensive and require installations in addition to the usual controlling gate. In such systems, moreover, either the area of the gate, or the head of water in the reservoir or canal, may vary from time to time, so that the flow of water through the gate is not always the same. The principal object of the present invention is to provide a simple apparatus by which the amount of water flowing through the controlling gate can be quickly and accurately measured. The gate itself is used as one element of the measuring means, and the remaining elements are simple and inexpensive and are adapted to be buried beneath the usual embankment which confines the reservoir or canal, and which is frequently used as a roadway.

Although the invention is especially adapted for the use described above, it is not limited thereto, but may be employed in any situation where the amount of liquid flowing through an orifice is to be measured. It is to be understood, moreover, that variations, within the scope of the claims hereto appended, may be made in the construction, arrangement and use of the herein described apparatus, without departing from the spirit of the invention as set forth in said claims.

The invention will be fully described hereinafter, with reference to the accompanying drawing, wherein:—

Fig. 1 is a vertical section illustrating the invention as applied to an irrigation system.

Fig. 2 is a transverse section on the line 2—2 of Fig. 1.

Fig. 3 is a front elevation of the gate, taken on the line 3—3 of Fig. 1.

In the drawing, the reference numeral 1 designates the supply reservoir, canal or conduit, and 2 is an embankment thereof; 3 is the level of the water in the canal 1; 4 is the consumer's branch conduit through which he takes his water from the main conduit or canal into his private ditch or reservoir at 4'. The branch conduit 4 is controlled by a suitable gate, which is of the well known sliding disk type, having a frame 5, and a dished or concavo-convex disk 6 slidable up and down to open and close the conduit 4. The disk is operated by a rod 7, whose upper end is threaded through a hand wheel 8 bearing upon a cross member of the frame 5. It is convenient to attach a pointer 9 to the gate rod 7, and to provide a suitably marked scale 10 on one of the frame uprights, as shown in Fig. 3, for indicating the area of the gate opening; although the same can be determined by measuring the extent of protrusion of the rod 7 above the wheel 8.

Means are provided for indicating the difference in hydraulic head on the two sides of the gate. As a preferred example of such means, there is illustrated in Figs. 1 and 2 a pair of receptacles 11 and 12 sunk in the embankment 2 in any convenient arrangement adjacent to the gate. The receptacle 11 is connected with the main conduit or canal 1 by a pipe 13, and the receptacle 12 is connected with the branch conduit 4 by an aperture 14. Water will stand in the receptacle 11 at the same level as in the canal 1, and in the receptacle 12 at a lower level, due to the loss of head in flowing through the gate. Measuring the levels of the water in the two receptacles, by inserting measuring rods as indicated at 15, gives the loss of head, and this, when properly correlated with the area of gate opening as indicated either by the pointer and scale, 9 and 10, or by measuring the protruding screw 7, gives the quantity of water flowing through the gate. The correlation between loss of head and gate area can be made either by calculation according to a well known mathematical formula, or by reference to a previously prepared chart or table.

It is necessary to proper operation of the device as a meter, that the conduit 4 be kept full of water at all times. Accordingly, I provide some form of baffle at its outlet end, such as a short upturned elbow 16. When the level of the water in the consumer's ditch 4' is above the top of the conduit 4, as shown at 17 in Fig. 1, the elbow 16 has no function, but when said level drops below the top of the conduit 4, said elbow traps sufficient water in said conduit to keep it full. It is essential, however, that the baffle or elbow 16 interpose no restriction to the free flow of water through the conduit 4, except to the extent necessary to keep it full. That is to say, the outlet 18 of said conduit must be free and of greater area than the maximum effective area of the gate.

The gate disk 6, as stated above, is dished, its upstream face being convex and its downstream face concave, as is customary in such gates. Its annular seating face 19 is flat, to fit tightly upon the annular flat face of the seat ring 20. This dished form of the gate disk 6 has an important bearing upon the accuracy of the device as a meter, for the reason that it allows water to enter the conduit at the top of the seat ring 20, as indicated at 21, such water flowing around and behind the disk 6 and between its concave rear face and the seat ring 20. This additional water assists in filling the conduit, preventing a partial void or air pocket which would otherwise exist in the upper portion of said conduit immediately behind the gate. That is to say, if the gate disk were flat, or otherwise so constructed that water entered the conduit only beneath the bottom of said disk, the upper portion of said conduit, immediately behind the gate, would either be empty, or the pressure at that point would be abnormally low, in either case adversely affecting the accuracy of the device as a meter.

The above described effect of the dished gate disk does not apply when the gate is fully open, as the water then enters the conduit 4 through the entire area of the seat ring 20, but it has a most important bearing upon the accurate measuring function of the device when the gate is partly open.

It should be borne in mind that the hydraulic principle involved is that the amount of water flowing through a restricted orifice can be computed if the effective area of the orifice and the loss of head of the water in passing through it be known. Both factors are variable in irrigation practice. The consumer may require a greater flow at one part of the season than at another, or conditions of supply and demand may necessitate his taking a smaller flow at certain times. Hence the gate may be opened more or less, depending upon conditions, but whatever its opening may be, its effective area is known, through previous calibration, either by the pointer and scale 9 and 10, or by the protrusion of the screw 7 through the nut 8. The loss of head is also variable, depending both upon the gate opening and the static heads on each side thereof.

In order to measure accurately the head in the conduit 4, it is necessary that said conduit be full, and in order that the loss of head in passing through the gate, together with the area of said gate, may give an accurate measure of the water flowing through the conduit, it is necessary that there be no restriction between said gate and the outlet of the conduit, i. e. that the gate shall be the only restrictive orifice. These last mentioned conditions are fulfilled by providing the conduit with the baffle or elbow 16 at its outlet, which serves to keep it full without restricting the flow, It should be noted that my invention provides a simple and effective means for measuring flowing water, and is especially useful in irrigation practice. It makes use of the ordinary controling gate and the usual conduit buried in the embankment, and requires only the addition of the terminal baffle and the measuring chambers, and the calibration of the gate, to convert the usual supply installation into an accurate and easily operated meter. The measuring chambers are comparatively small and do not interfere with the use of the embankment as a roadway, and the conduit may be corrugated, as shown, for greater strength when the embankment is so used, without affecting the metering function of the device.

I claim:—

1. An apparatus for ascertaining the amount of water flowing from a reservoir comprising a closed conduit constituting an outlet for the water in said reservoir, a baffle in said conduit to cause it to remain full of water at all times, a movable gate at the intake end of said conduit constituting a controllable restrictive orifice therefor, said gate being formed to provide a plurality of water admitting apertures distributed over the cross-sectional area of said conduit, means for indicating the effective area of opening of said gate, and means for indicating the respective heads of water on opposite sides of said gate.

2. An apparatus for ascertaining the amount of water flowing from a reservoir comprising a closed conduit constituting an outlet for the water in said reservoir, a baffle in said conduit to cause it to remain full of water at all times, a gate seat ring at the intake end of said conduit, said ring having a flat annular seat and its free area being no greater than that of any other portion of said conduit, a movable gate having a flat peripheral seating face cooperating with said seat, the down-stream side of said gate within said peripheral seating face being concave whereby when said gate is partly open water may flow between said concave side and the seat ring into the upper portion of the conduit, means for indicating the effective area of opening of said gate, and means for indicating the respective heads of water on opposite sides of said gate.

3. An apparatus for ascertaining the amount of water flowing from a reservoir, said reservoir having a confining embankment, comprising a closed conduit buried beneath said embankment and constituting an outlet for said reservoir, a movable gate at the intake end of said conduit constituting a restrictive orifice therefor, said gate being formed to provide a plurality of water admitting apertures distributed over the cross-sectional area of said conduit, means for indicating the effective area of opening of said gate, separate receptacles positioned adjacent said gate and communicating respectively with said reservoir and said conduit, and means for indicating the head of water in each receptacle.

CLARENCE F. JOHNSON.